United States Patent [19]

Pankhania

[11] Patent Number: 5,722,651
[45] Date of Patent: Mar. 3, 1998

[54] SHEET HANDLING

[75] Inventor: Jagdish Pankhania, Middlesex, United Kingdom

[73] Assignee: Crosfield Electronics Limited, Herts, United Kingdom

[21] Appl. No.: 642,640

[22] Filed: May 3, 1996

[30] Foreign Application Priority Data

May 4, 1995 [GB] United Kingdom ............ 9509065

[51] Int. Cl.$^6$ ............................................ B65H 5/00
[52] U.S. Cl. .......................... 271/3.19; 271/5; 271/12; 271/30.1; 271/188; 271/271; 271/245; 270/58.33
[58] Field of Search ............................ 271/3.03, 3.19, 271/5, 4.09, 4.08, 11, 12, 30.1, 188, 277, 271, 245; 270/58.33, 58.34

[56] References Cited

U.S. PATENT DOCUMENTS

| | | | |
|---|---|---|---|
| 3,265,383 | 8/1966 | Shute | 271/11 |
| 4,262,895 | 4/1981 | Wenthe | 271/188 |
| 4,531,725 | 7/1985 | Seelen | 271/188 |
| 4,603,253 | 7/1986 | Nakagawa | 250/327.2 |
| 4,886,968 | 12/1989 | Ohnishi et al. | 250/327.2 |
| 4,932,644 | 6/1990 | Nzei | 270/58.33 |
| 5,583,663 | 12/1996 | Boeve | 271/188 |

FOREIGN PATENT DOCUMENTS

| | | |
|---|---|---|
| 0 213 511 A2 | 3/1987 | European Pat. Off. |
| 0 523 750 A1 | 1/1993 | European Pat. Off. |
| 0 571 149 A2 | 11/1993 | European Pat. Off. |
| 1 268 656 | 5/1968 | Germany |
| 0262359 | 10/1988 | Japan ............ 271/188 |
| 404153132 A | 5/1992 | Japan ............ 271/11 |

*Primary Examiner*—H. Grant Skaggs
*Attorney, Agent, or Firm*—Sughrue, Mion, Zinn, Macpeak & Seas, PLLC

[57] ABSTRACT

A system for separating alternately stacked first and second sheets (5,6) such as film plates and paper. The system comprises a first sheet holding device (8,9) for holding a first sheet (5) of the stack; an eccentric (2) for causing relative separation movement between a sheet held by the first sheet holding device and the remainder of the stack so that the held sheet is positioned spaced above the remainder of the stack, the first sheet holding device being laterally moveable to feed the separated first sheet to an exit (12). A second sheet removal device (14) is provided for laterally feeding a second sheet (6) from the stack to an exit in generally the same lateral direction as the first sheet.

14 Claims, 4 Drawing Sheets

SHEET HANDLING

FIELD OF INVENTION

The invention relates to methods and apparatus for handling sheets, and is particularly concerned with handling sheets such as film plates for internal drum imagesetters.

DESCRIPTION OF THE RELATED ART

Film plates for internal drum imagesetters have a significant size up to 1 m$^2$ or more and in a typical commercial installation there is a need to be able to feed these film plates automatically to the imagesetter for imaging. Conventionally, the sheets are supplied in a stack with paper sheets interleaved between them. It is therefore necessary to separate a film plate from the stack and feed it to the imagesetter and then to remove the paper separator so that access can be obtained to the next film plate. In the past, a pinch mechanism has been used to remove the paper separator sheet and the resulting apparatus has been bulky which is undesirable.

SUMMARY OF THE INVENTION

In accordance with a first aspect of the present invention, a system for separating alternately stacked first and second sheets comprises a first sheet holding device for holding a first sheet of the stack; means for causing relative separation movement between a sheet held by the first sheet holding device and the remainder of the stack so that the held sheet is positioned spaced above the remainder of the stack, the first sheet holding device being laterally moveable to feed the separated first sheet to an exit; and a second sheet removal device for laterally feeding a second sheet from the stack to an exit in generally the same lateral direction as the first sheet.

In accordance with a second aspect of the present invention, a method of separating alternately stacked first and second sheets comprises separating a first sheet from the top of the stack and holding the separated first sheet at a position spaced above the remainder of the stack; feeding the separated first sheet to an exit; and laterally feeding a second sheet from the top of the remainder of the stack to an exit in generally the same lateral direction as the first sheet.

We have devised a much more compact system and method for separating or de-interleaving sheets in the stack. By withdrawing all sheets from the stack in substantially the same lateral direction, the system can be made very compact and is ideally suited for use with stacks of film plates separated by paper sheets for use with an imagesetter. Such an imagesetter could be either an internal drum imagesetter or an external drum imagesetter.

Typically, the first sheets will be less flexible than the second sheets.

Conveniently, the two exits are separate and are positioned one above the other although a common exit is also possible.

The first sheet holding device can be of any conventional form but conveniently is vacuum based and holds the first sheet under vacuum.

The means for causing relative movement between the first sheet holding device and the remainder of the stack can be provided in a variety of ways. For example, this means could be provided by apparatus for moving the first sheet holding device while the stack remains stationary. Alternatively, the first sheet holding device could remain stationary while the stack is mounted on a support which can be moved away from the first sheet holding device.

Conveniently, however, both the first sheet holding device and a stack support on which the stack is provided are each moveable towards and away from one another.

Typically, where a moveable stack support is provided, an eccentric mechanism is utilized for causing movement of the stack support. This provides a very simple method of moving the stack which is easily controllable. Preferably, movement of the stack support is responsive to a sensor provided to sense when the top of the stack is at a predetermined position, at which a first sheet at the top of the stack may be held by the first sheet holding device.

The second sheet removal device may also take any conventional form but is conveniently in the form of a friction feed device such as a friction feed wheel.

Conveniently, a dump bin is positioned downstream of the exit into which second sheets are guided.

As has been mentioned above, the system according to the first aspect of the invention can be used in a variety of applications for de-interleaving a stack of sheets. De-interleaved sheets may simply be manually extracted from the exit but in the preferred application, a transport mechanism is provided downstream of the exit to receive separated first sheets and to feed them to a further exit.

Preferably, the transport mechanism is reversible and further includes a diverter so that on reverse operation, sheets fed by the transport mechanism are diverted away from the stack. Again, this is particularly useful in the case of an imagesetter where processed film plates can be fed back to the transport mechanism but are then diverted out to a separate storage or extraction location.

In accordance with a third aspect of the present invention, an internal drum imagesetter comprises a curved, inwardly facing support surface; means at an input position for feeding a film plate onto and along the support surface; a stop against which a leading edge of the film plate engages after being fed onto the support surface; and pusher means for engaging a trailing edge of the film plate when the leading end has engaged the stop, the pusher means being selectively moveable to push the trailing edge along the surface until the film plate conforms with the support surface.

This aspect of the invention makes use of the inherent stiffness of a film plate whereby pushing the trailing edge of the film plate while the leading edge is held against the stop imparts a circumferential force which causes the film plate to bend radially outwardly to conform with the support surface which is typically semi-cylindrical.

Conveniently, the imagesetter further comprises a stepper motor for operating the pusher means (which may be in the form of one or more fingers). This leads to the possibility of preprogramming operation of the stepper motor in accordance with the size of film plate being loaded. Thus, the operator can indicate to the imagesetter the size of film plate and when this has been loaded onto the support surface, the stepper motor will operate for a predetermined number of steps according to the film plate size thus ensuring that the film plate is fully conformed with the support surface.

BRIEF DESCRIPTION OF THE DRAWINGS

An example of an imagesetter and a film plate loading system according to the invention will now be described with reference to the accompanying drawings, in which.

DETAILED DESCRIPTION OF AN EMBODIMENT

Figure 1:
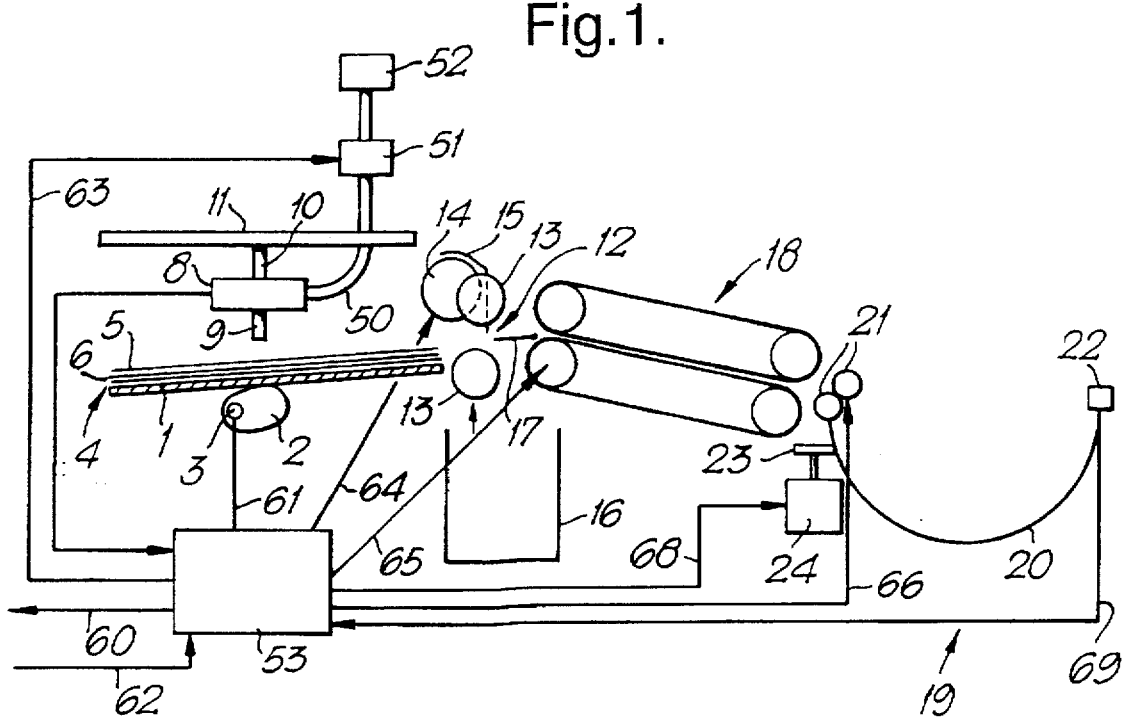
FIGS. 1–7 are schematic, side views of the apparatus during successive stages of a loading, imaging and unloading cycle.

The apparatus shown in the drawings comprises a stack support plate 1 which rests on a cam 2 eccentrically mounted to a shaft 3. The support plate 1 is pivoted at 4. In use, a stack of film plates 5 separated by interleaved paper sheets 6 is positioned on the plate 1.

Above the stack support plate 1 is positioned a bar 8 carrying a number of vacuum ports 9 (only one shown) connected via tubing 50 and a valve 51 to a vacuum source 52. The bar 8 is vertically movably mounted via a connector 10 such as a lead screw to a support 11 along which the connector can move in a left-right direction as seen in the drawings.

In this example, a film plate exit 12 is defined between a pair of relatively movable pinch rollers 13 which, in FIG. 1, are shown in a spaced apart position, one of the rollers being connected to a drive motor (not shown).

A movable friction feed wheel 14 having an associated guide 15 is positioned at a rest position as shown in FIG. 1 out of engagement with the stack but is movable, as will be explained below, to engage the stack and remove paper sheets which are fed to a bin 16.

Each film plate 5 passes via a diverter 17 to a belt transport system 18 which passes the film plate to an imagesetter 19 having a semi-cylindrical drum 20. Film plates are fed onto the inwardly facing surface of the drum 20 via pinch feed rollers 21 until the leading edge of a film plate engages a stop 22. Fingers (one of which is shown schematically at 23) are provided at the upstream end of the drum 20 to engage a trailing end of a film plate through corresponding apertures (not shown) in the drum 20 and push it towards the stop 22 under control of a stepper motor 24 to cause the film plate to conform to the internal surface of the drum 20. The mounting of the fingers 23 is not shown while the connection to the motor 24 is shown only schematically. A person skilled in the art will readily recognise that there are many ways in which this mechanical arrangement can be realised.

Figure 2:
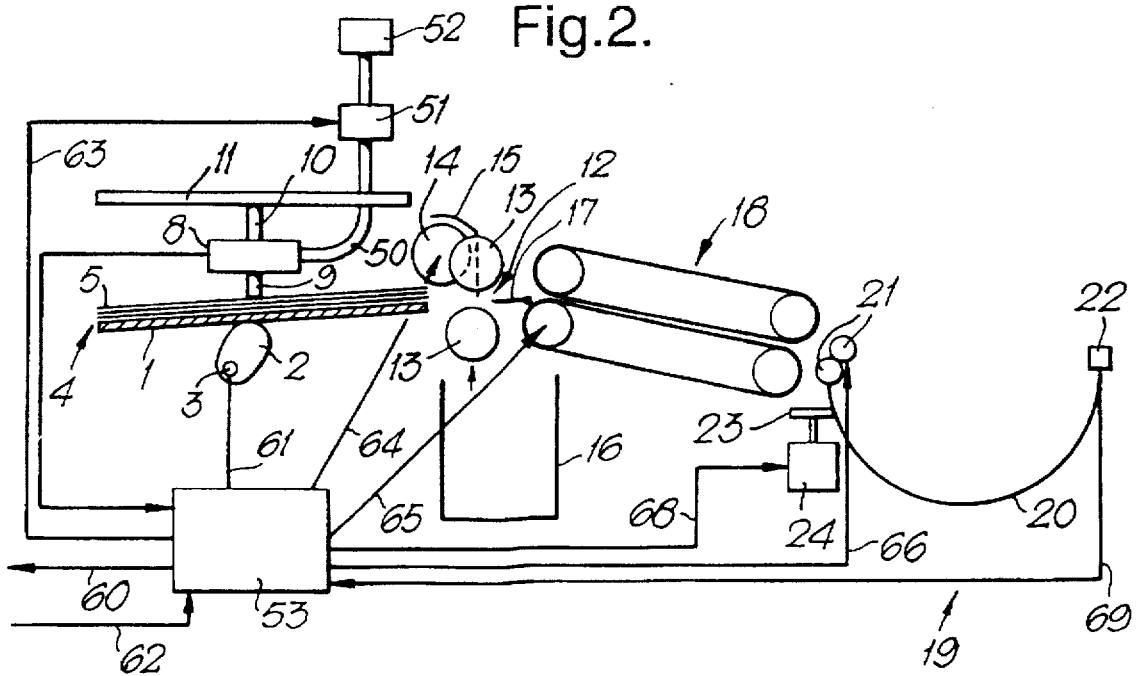

A typical sequence of operations will now be described. Initially, a stack of film plates and interleaved paper sheets 5,6 is positioned on the support plate 1 (FIG. 1). The bar 8 is caused to descend relative to the support 11 by rotation of the lead screw 10 via control signals on a line 60 to the position shown in FIG. 1 where it stops. A motor (not shown) under the control of a controller 53 via a line 61 causes the shaft 3 to rotate in an anti-clockwise direction thereby rotating the cam 2 so as to cause the plate 1 to rotate about the pivot 4 until the uppermost film plate 5 engages vacuum ports 9 (FIG. 2). Rotation of the shaft 3 stops when a sensor (not shown) mounted on the bar 8 and connected to the controller 53 via a line 62 senses that the uppermost film plate 5 engages the ports 9.

Figure 3:
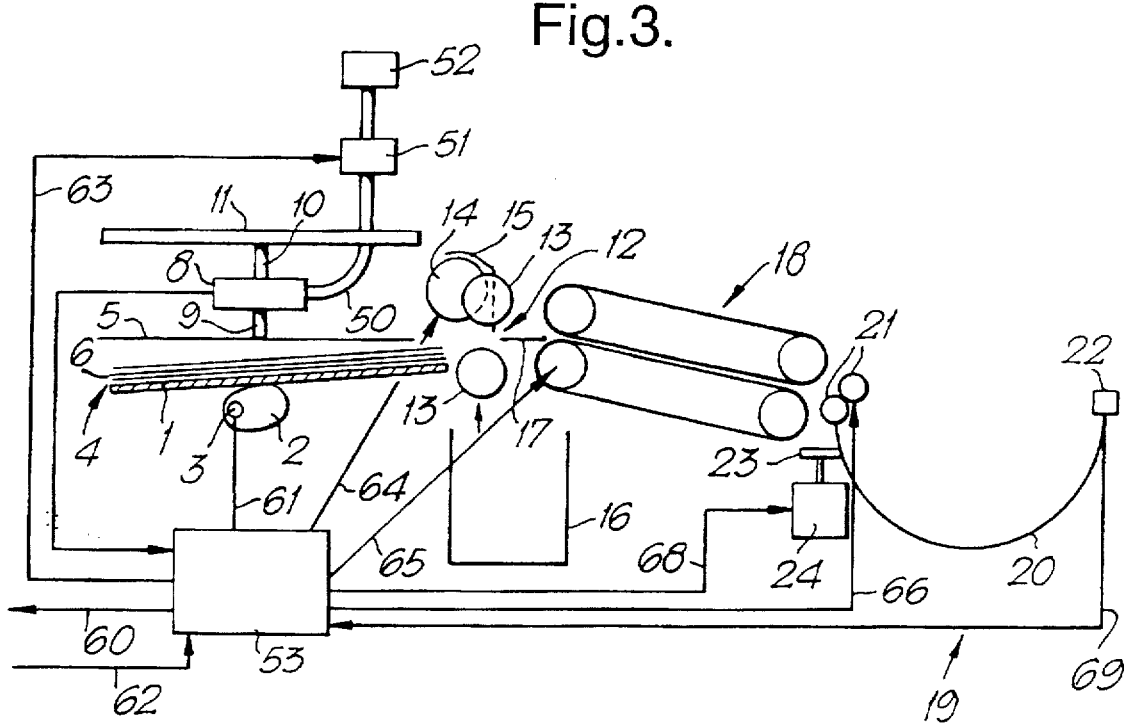

The shaft 3 is then rotated in a clockwise direction under control of the controller 53 to cause the plate 1 to move back towards its initial position and at the same time vacuum is applied through the ports 9 by actuating the valve 51 via a line 63 so as to hold the top most film plate 5. In this way the top most film plate 5 is separated from the remainder of the stack as shown in FIG. 3.

Figure 4:
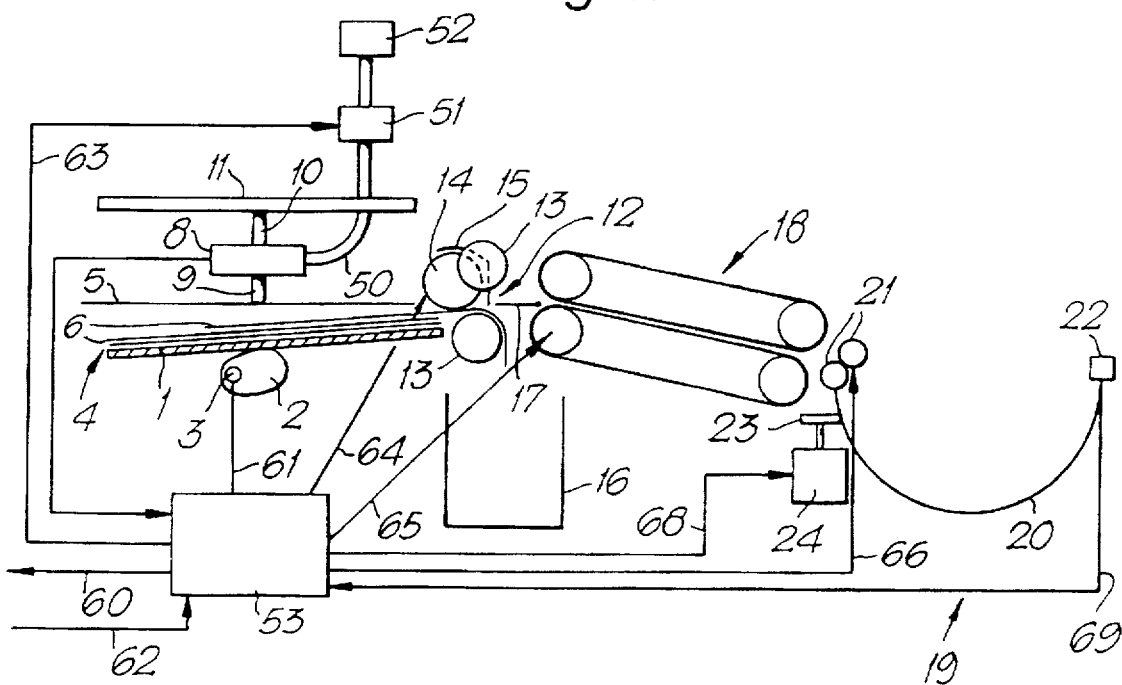

The friction feed wheel 14 is then moved by the controller 22 via signals on a line 64 into engagement with the top most paper sheet 6 while the plate 5 continues to be held by the vacuum ports 9. The friction feed wheel 14 is then rotated in an anti-clockwise direction which draws the top most paper sheet 6 off the stack, the sheet being guided by the guide 15 down into the bin 16. (FIG. 4). The friction feed roller 14 is then moved away and back to its rest position.

Figure 5:
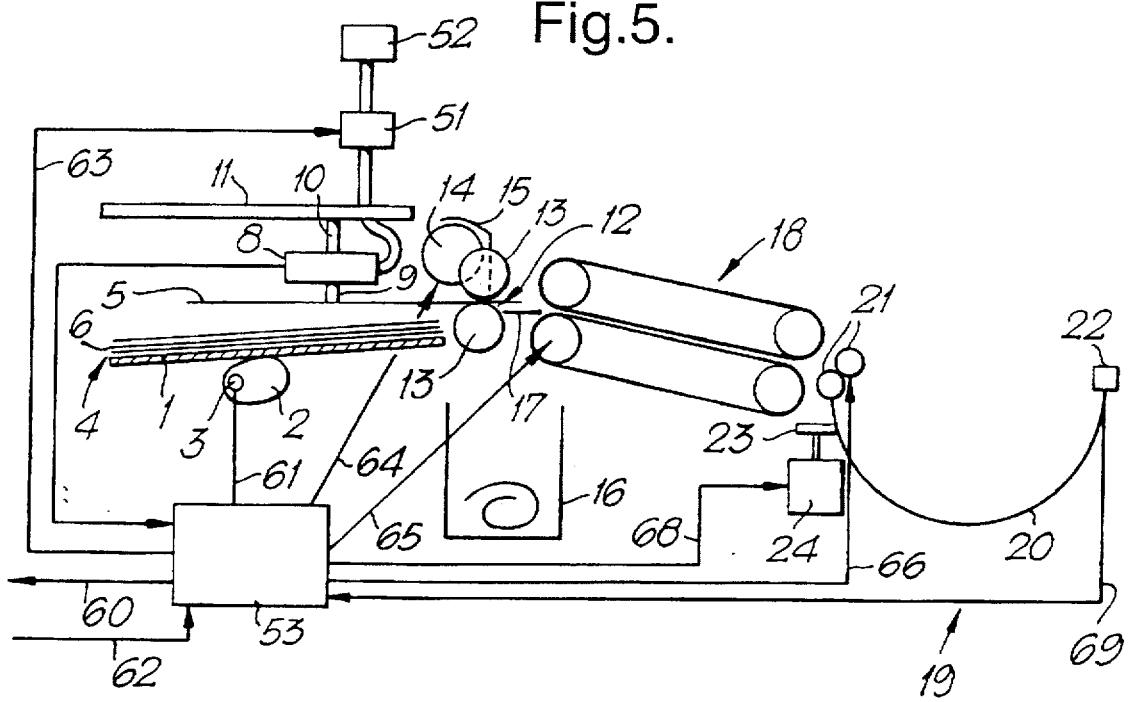

Once the paper sheet has been removed, the bar 8 is moved by the controller 53 towards the right as shown in the drawing (FIG. 5) to insert the extracted film plate 5 between the pinch rollers 13 which are themselves then moved together as shown in FIG. 5. The pinch rollers 13 and the transport 18 are activated by the controller 53 via a line 65 and the vacuum turned off by closing valve 51 so that the film plate 5 is fed to and through the transport 18 to the imagesetter 19. At the imagesetter, the film plate is fed between the pinch rollers 21 controlled via line 66 which feed the film plate onto and along the inwardly facing surface of the drum 20 until the leading end of the film plate engages the stop 22. This engagement is detected by a sensor (not shown) connected to the controller 53 via a line 67 which then actuates the stepper motor 24 via a line 68 to cause the fingers 23 to engage and push the trailing end of the film plate further into the drum which causes the film plate to conform with the internal surface of the drum.

The controller 53 is preprogrammed with the number of steps to be carried out by the stepper motor 24 depending on film size. As explained earlier, the operator will notify the controller 53 of the film plate size at the beginning of an imaging operation.

Figure 6:
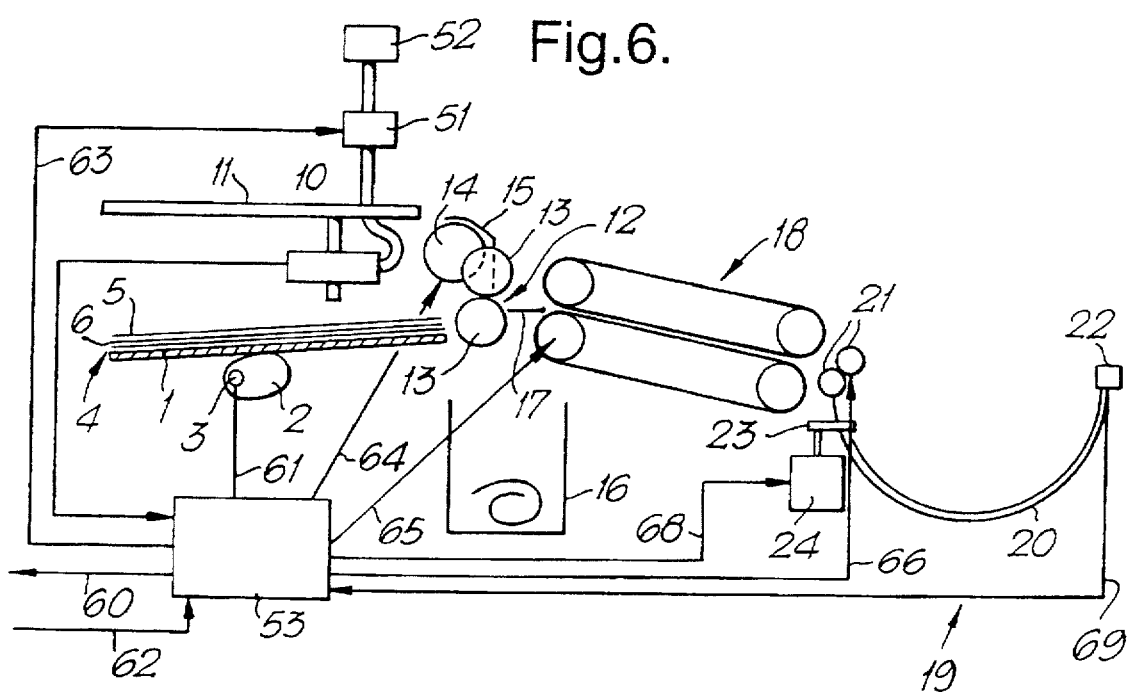

This position is shown in FIG. 6.

Figure 7:
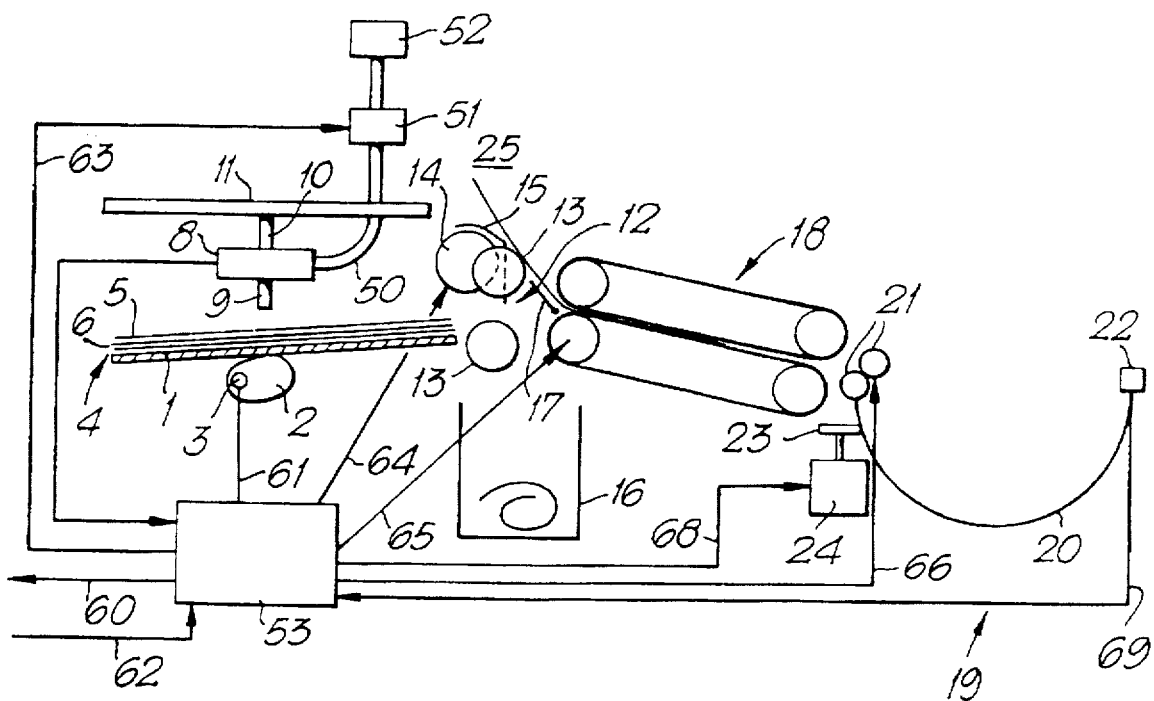

After imaging in a conventional manner, the film plate needs to be removed from the imagesetter 19. This is achieved by feeding the film plate back through the pinch rollers 21 and the transport 18 towards the diverter 17 which is moved to the position shown in FIG. 7 so that the imaged film plate is diverted away from the original stack towards an extraction point 25.

It will be appreciated that there are many variations in the precise form of the apparatus which can be implemented. For example, as described above, the film plate exit and the paper sheet exit are in similar positions. In other arrangements, however, the friction feed wheel 14 is positioned below the pinch wheels 13 (the stack support plate 1 also being in a lower position) so that paper sheets are extracted through an exit below the film plate exit.

Furthermore, the exact sequence of extraction can be different from that described. In particular, where the paper sheet exit and the film plate exit are separated, it will be possible to remove the paper sheet after the separated film sheet has been fed towards the imagesetter.

It will also be appreciated that many parts of the apparatus have been omitted for clarity. Various sensors will be provided to monitor the position of the film plate during its passage through the apparatus and the connections to the controller 53 from those sensors and the various motors needed to move the components have only been shown schematically.

I claim:

1. A system for separating alternately stacked first and second sheets, the system comprising a first sheet holding device for holding a first sheet of the stack; means for causing relative separation movement between a sheet held by said first sheet holding device and the remainder of the stack so that the held sheet is positioned spaced above the remainder of the stack, said first sheet holding device being laterally moveable to feed the separated first sheet to an exit; and a second sheet removal device for laterally feeding a second sheet from the stack to an exit in generally the same lateral direction as the first sheet.

2. A system according to claim 1, wherein said first sheet holding device includes means for holding first sheets under vacuum.

3. A system according to claim 1, wherein said means for causing relative separation movement includes a sheet stack support which is movable towards and away from said first sheet holding device.

4. A system according to claim 3, further comprising an eccentric mechanism for causing movement of said stack support.

5. A system according to claim 1, wherein said second sheet removal device is a friction feed device.

6. A system according to claim 1, further comprising a transport mechanism downstream of said first sheet exit to receive separated first sheets and to feed them to a further exit.

7. A system according to claim 6, wherein said transport mechanism is reversible and further includes a diverter so that on reverse operation, sheets fed by the transport mechanism are diverted away from the stack.

8. A system according to claim 1, wherein said first and second sheet exits are formed by a common exit.

9. An imagesetter coupled to a system for separating alternately stacked first and second sheets, the first sheets comprising film plates and the second sheets comprising separators, the system comprising a first sheet holding device for holding a first sheet of the stack; means for causing relative separation movement between a sheet held by said first sheet holding device and the remainder of the stack so that the held sheet is positioned spaced above the remainder of the stack, said first sheet holding device being laterally moveable to feed the separated first sheet to an exit; and a second sheet removal device for laterally feeding a second sheet from the stack to an exit in generally the same lateral direction as the first sheet, and means for transporting first sheets from said first sheet exit to an input of said imagesetter.

10. An internal drum imagesetter comprising a curved, inwardly facing support surface; means at an input position for feeding a film plate onto and along said support surface; a stop against which a leading edge of the film plate engages after being fed onto said support surface; and pusher means for engaging a trailing edge of the film plate when the leading end has engaged said stop, said pusher means being selectively moveable to push the trailing edge along said surface until the film plate conforms with the support surface.

11. An imagesetter according to claim 10, further comprising a stepper motor for operating said pusher means.

12. An imagesetter according to claim 11, further comprising control means for controlling operation of said stepper motor, said control means being preprogrammed with data defining the number of steps which are to be applied by said pusher means for each of a set of different sized film plates.

13. A system for separating alternately stacked first and second sheets, and for supplying said first sheet to an internal drum imagesetter, said system comprising a first sheet holding device for holding a first sheet of the stack; means for causing relative separation movement between a sheet held by said first sheet holding device and the remainder of the stack so that the held sheet is positioned spaced above the remainder of the stack, said first sheet holding device being laterally moveable to feed the separated first sheet to an exit; and a second sheet removal device for laterally feeding a second sheet from the stack to an exit in generally the same lateral direction as the first sheet, wherein said first sheet is a film plate, and said internal drum imagesetter comprising a curved inwardly facing support surface; means at an input position for feeding a film plate onto and along said support surface; a stop against which a leading edge of the film plate engages after being fed onto said support surface; and pusher means for engaging a trailing edge of the film plate when the leading end has engaged said stop, said pusher means being selectively moveable to push the trailing edge along said surface until the film plate conforms with the support surface.

14. A method of separating alternately stacked first and second sheets comprising separating a first sheet from the top of the stack and holding the separated first sheet at a positioned spaced above the remainder of the stack; feeding the separated first sheet to an exit; and laterally feeding a second sheet from the top of the remainder of the stack to an exit in generally the same lateral direction as the first sheet.

* * * * *